US011214954B2

(12) United States Patent
Styrc et al.

(10) Patent No.: US 11,214,954 B2
(45) Date of Patent: Jan. 4, 2022

(54) MODULAR FURNITURE SYSTEM

(71) Applicant: 2724889 ONTARIO INC., Oakville (CA)

(72) Inventors: Jacek Styrc, Oakville (CA); Sebastian Lysiak, Bielsko-Biała (PL)

(73) Assignee: 2724889 ONTARIO INC., Oakville (CA)

( * ) Notice: Subject to any disclaimer, the term of this patent is extended or adjusted under 35 U.S.C. 154(b) by 0 days.

(21) Appl. No.: 16/849,075

(22) Filed: Apr. 15, 2020

(65) Prior Publication Data

US 2020/0240130 A1  Jul. 30, 2020

Related U.S. Application Data

(63) Continuation of application No. 16/485,272, filed as application No. PCT/CA2018/050169 on Feb. 15, (Continued)

(51) Int. Cl.
*E04B 1/19* (2006.01)
*A45F 3/24* (2006.01)
(Continued)

(52) U.S. Cl.
CPC .............. *E04B 1/1912* (2013.01); *A45F 3/24* (2013.01); *E04B 1/0046* (2013.01); *E04B 1/2608* (2013.01); *E04F 10/02* (2013.01); *E04F 10/08* (2013.01); *F16M 11/24* (2013.01); *E04B 1/5831* (2013.01); *E04B 2001/199* (2013.01);
(Continued)

(58) Field of Classification Search
CPC ........ E04B 1/1912; E04B 1/2608; E04B 1/26; E04B 2001/2676; E04B 2001/2644; E04B 2001/266; E04B 2001/2684; E04B 2001/2692; F16B 7/044; F16B 7/0433; E04H 1/1205
See application file for complete search history.

(56) References Cited

U.S. PATENT DOCUMENTS 451,596 A   5/1891  Longenecker
490,122 A   1/1893  Magargal
(Continued)

FOREIGN PATENT DOCUMENTS

CA   3007687 A1   12/2018
EP   2492408 A1    8/2012
(Continued)

OTHER PUBLICATIONS

International Search Report of the International Searching Authority for PCT/CA2018/050169, Canadian Intellectual Property Office, Lily Truong, Canada, dated Jun. 21, 2018.
(Continued)

*Primary Examiner* — Gisele D Ford
(74) *Attorney, Agent, or Firm* — Bhole IP Law; Anil Bhole; Marc Lampert

(57) ABSTRACT

A modular framework having a plurality of elongate structural members interconnected by brackets is provided. Each of the brackets includes at least one tubular socket to receive a structural member, and an array of holes is provided on a face of the socket to permit connection of an attachment to the bracket to support ancillary components.

24 Claims, 16 Drawing Sheets

Related U.S. Application Data 2018, now Pat. No. 10,858,819, which is a continuation of application No. 15/815,973, filed on Nov. 17, 2017, now abandoned.

(60) Provisional application No. 62/461,308, filed on Feb. 21, 2017.

(51) Int. Cl.
*F16M 11/24* (2006.01)
*E04B 1/26* (2006.01)
*E04F 10/02* (2006.01)
*E04F 10/08* (2006.01)
*E04B 1/00* (2006.01)
*E04B 1/58* (2006.01)
*E04B 1/38* (2006.01)

(52) U.S. Cl.
CPC .......... *E04B 2001/1963* (2013.01); *E04B 2001/1984* (2013.01); *E04B 2001/1993* (2013.01); *E04B 2001/266* (2013.01); *E04B 2001/2644* (2013.01); *E04B 2001/2676* (2013.01); *E04B 2001/2684* (2013.01); *E04B 2001/405* (2013.01); *E04B 2001/5887* (2013.01)

(56) References Cited

U.S. PATENT DOCUMENTS

| | | | |
|---|---|---|---|
| 922,215 A | 5/1909 | Tuteur |
| 949,394 A | 2/1910 | Daly |
| 1,097,934 A | 5/1914 | Price |
| 1,201,159 A | 10/1916 | Dettmer |
| 1,214,738 A | 2/1917 | Wolf |
| 1,441,559 A | 1/1923 | Jacob |
| 1,816,049 A | 7/1931 | Larner |
| 1,848,085 A | 3/1932 | Eisenschmidt |
| 2,016,702 A | 10/1935 | Harry |
| 2,037,736 A | 4/1936 | Payne et al. |
| 2,153,547 A | 4/1939 | Charlop |
| 2,225,599 A | 12/1940 | Zillig |
| D141,423 S | 5/1945 | Lewis |
| 2,477,163 A | 7/1949 | Barnett |
| D178,316 S | 7/1956 | Vegors |
| 2,869,693 A | 1/1959 | Wood |
| 2,931,129 A | 4/1960 | Boniface |
| 3,188,696 A | 6/1965 | Earhart |
| 3,229,004 A | 1/1966 | Lewine |
| 3,252,287 A | 5/1966 | Suzuki |
| 3,278,149 A | 10/1966 | Brucker |
| 3,294,298 A | 12/1966 | Danielson |
| 3,310,324 A | 3/1967 | Boden |
| 3,352,491 A | 11/1967 | Nelson |
| 3,369,333 A | 2/1968 | Wheeler |
| 3,462,021 A | 8/1969 | Hawke |
| 3,537,221 A | 11/1970 | Helfman et al. |
| 3,545,796 A | 12/1970 | Nicholls |
| 3,615,110 A | 10/1971 | Fugate |
| 3,740,084 A | 6/1973 | Tellberg |
| D232,201 S | 7/1974 | Hoffman |
| 3,829,999 A | 8/1974 | Bernstein |
| 3,907,445 A | 9/1975 | Wendt |
| 3,945,741 A | 3/1976 | Wendt |
| 3,989,398 A | 11/1976 | Wendt |
| D245,649 S | 9/1977 | Hughes |
| 4,046,186 A | 9/1977 | Nordstrom |
| 4,046,295 A | 9/1977 | Eichler |
| 4,076,431 A | 2/1978 | Burvall |
| D250,240 S | 11/1978 | Braginetz |
| D250,241 S | 11/1978 | Braginetz |
| 4,125,973 A | 11/1978 | Lendrihas |
| 4,125,984 A | 11/1978 | Jonas |
| 4,133,151 A | 1/1979 | Burvall |
| D251,018 S | 2/1979 | Lockwood |
| D258,194 S | 2/1981 | Stanley |
| 4,313,688 A | 2/1982 | Daniels |
| D264,481 S | 5/1982 | Russo |
| 4,381,629 A | 5/1983 | Ahn |
| 4,422,792 A | 12/1983 | Gilb |
| 4,429,730 A | 2/1984 | Elston |
| D275,264 S | 8/1984 | Wegener |
| D277,819 S | 3/1985 | Crosslen |
| D280,466 S | 9/1985 | Seltzer et al. |
| 4,572,695 A | 2/1986 | Gilb |
| 4,594,017 A | 6/1986 | Hills |
| 4,616,950 A | 10/1986 | Morris |
| 4,630,550 A | 12/1986 | Weitzman |
| D289,605 S | 5/1987 | Lytle |
| 4,665,672 A | 5/1987 | Commins et al. |
| 4,717,279 A | 1/1988 | Commins |
| D294,805 S | 3/1988 | Boyer |
| 4,801,121 A | 1/1989 | Zunker |
| 4,856,252 A | 8/1989 | Cornell |
| 4,885,883 A | 12/1989 | Wright |
| 4,910,939 A | 3/1990 | Cavanagh |
| 4,919,394 A | 4/1990 | Otte et al. |
| 4,925,141 A | 5/1990 | Classen |
| D310,760 S | 9/1990 | Murphy |
| 4,991,726 A | 2/1991 | Johnson |
| D318,569 S | 7/1991 | Schaefer |
| 5,033,901 A | 7/1991 | Dias |
| 5,072,465 A * | 12/1991 | Lyons, Jr. .............. A47G 9/086 5/121 |
| 5,104,252 A | 4/1992 | Colonias et al. |
| 5,150,982 A | 9/1992 | Gilb |
| 5,186,571 A | 2/1993 | Hentzschel |
| 5,192,056 A | 3/1993 | Espinueva |
| 5,238,321 A | 8/1993 | Jarjoura |
| 5,259,685 A | 11/1993 | Gilb |
| D342,328 S | 12/1993 | Granstrom |
| D342,662 S | 12/1993 | Lavin, Sr. et al. |
| 5,284,311 A | 2/1994 | Baer |
| 5,375,384 A | 12/1994 | Wolfson |
| D355,349 S | 2/1995 | Taparauskas |
| D356,646 S | 3/1995 | Cole |
| RE34,892 E | 4/1995 | Dunwoodie |
| D361,462 S | 8/1995 | Newham |
| D365,714 S | 1/1996 | Masello |
| 5,490,523 A | 2/1996 | Mallookis |
| D370,681 S | 6/1996 | Diamond |
| 5,555,681 A | 9/1996 | Cawthorn |
| D374,937 S | 10/1996 | Salas |
| 5,590,974 A | 1/1997 | Yang |
| D398,219 S | 9/1998 | Campman |
| 5,941,183 A | 8/1999 | Ming-Shun |
| 5,941,527 A | 8/1999 | Selton |
| D426,041 S | 5/2000 | Boghossian |
| D427,810 S | 7/2000 | Ali et al. |
| 6,092,342 A | 7/2000 | Sharapata |
| 6,109,461 A | 8/2000 | Kluge et al. |
| D430,789 S | 9/2000 | Opperman |
| D434,880 S | 12/2000 | McNary et al. |
| D439,246 S | 3/2001 | Hansen |
| D442,236 S | 5/2001 | Chang |
| 6,230,466 B1 | 5/2001 | Pryor |
| 6,247,869 B1 | 6/2001 | Lichvar |
| D444,816 S | 7/2001 | Stravitz |
| 6,354,451 B1 | 3/2002 | Holst |
| D455,643 S | 4/2002 | Aubin |
| 6,463,711 B1 | 10/2002 | Callies |
| D465,646 S | 11/2002 | Hendrickson |
| 6,536,179 B2 | 3/2003 | Little |
| D492,040 S | 6/2004 | Kozak |
| 6,745,521 B1 | 6/2004 | Klemming |
| 6,751,921 B1 | 6/2004 | Iwakawa |
| D493,091 S | 7/2004 | Griggy |
| D508,572 S | 8/2005 | Suggate |
| 6,969,211 B2 | 11/2005 | Altman |
| 7,014,383 B2 | 3/2006 | Schmid et al. |
| 7,231,954 B2 | 6/2007 | Green |
| D547,863 S | 7/2007 | Heinsch |
| D548,064 S | 8/2007 | Norton |
| D558,041 S | 12/2007 | Skinner |

(56) References Cited

U.S. PATENT DOCUMENTS

| | | | |
|---|---|---|---|
| 7,431,389 B2 * | 10/2008 | Reeb | A47C 1/0265 297/184.15 |
| 7,464,513 B2 | 12/2008 | Rioux | |
| D598,734 S | 8/2009 | Miranda et al. | |
| 7,600,348 B1 | 10/2009 | Kostka | |
| D619,879 S | 7/2010 | McCarthy et al. | |
| D622,864 S | 8/2010 | Bajrami | |
| D650,987 S | 12/2011 | Rothbauer | |
| D658,491 S | 5/2012 | Raber | |
| D665,656 S | 8/2012 | Anzelmo | |
| 8,234,826 B1 | 8/2012 | Proffitt | |
| D673,306 S | 12/2012 | Min-Ju | |
| 8,429,857 B2 | 4/2013 | Melose | |
| D689,045 S | 9/2013 | Mardas | |
| D689,207 S | 9/2013 | Benet | |
| 8,572,905 B1 | 11/2013 | Driggers | |
| D701,108 S | 3/2014 | Rodgers | |
| 8,689,494 B2 | 4/2014 | Leavitt | |
| 8,720,129 B2 | 5/2014 | Sias et al. | |
| 8,739,476 B1 | 6/2014 | Royer | |
| 8,769,887 B2 | 7/2014 | Proffitt | |
| 8,870,163 B2 | 10/2014 | Regan | |
| 8,925,893 B2 | 1/2015 | Biedenweg et al. | |
| D726,342 S | 4/2015 | Rodriguez | |
| D727,143 S | 4/2015 | Gomez | |
| 9,091,037 B2 | 7/2015 | Fairbairn | |
| D737,670 S | 9/2015 | Beyerle et al. | |
| 9,144,291 B2 | 9/2015 | Huang | |
| D744,319 S | 12/2015 | White | |
| 9,228,338 B2 | 1/2016 | Lin | |
| D749,597 S | 2/2016 | Wengreen | |
| 9,388,540 B2 | 7/2016 | Koering | |
| D768,466 S | 10/2016 | Simmons et al. | |
| D769,470 S | 10/2016 | Criscione et al. | |
| D775,512 S | 1/2017 | White | |
| D776,965 S | 1/2017 | Anderson | |
| D783,390 S | 4/2017 | Nelson | |
| 9,631,770 B2 | 4/2017 | Holestine | |
| D805,218 S | 12/2017 | Malone | |
| 9,856,640 B2 | 1/2018 | Shuhaibar | |
| D820,359 S | 6/2018 | Deemer | |
| D822,454 S | 7/2018 | Kanter | |
| D824,399 S | 7/2018 | Wengreen | |
| 10,024,046 B2 | 7/2018 | Higginbotham | |
| 10,030,408 B2 | 7/2018 | Crandall et al. | |
| D825,967 S | 8/2018 | Tolokan et al. | |
| D826,695 S | 8/2018 | Bolster | |
| D827,414 S | 9/2018 | Macdonald et al. | |
| D832,858 S | 11/2018 | Wengreen | |
| D834,396 S | 11/2018 | Macdonald | |
| 10,202,766 B1 | 2/2019 | Fox | |
| D842,684 S | 3/2019 | House | |
| D845,116 S | 4/2019 | Wokutch | |
| D845,310 S | 4/2019 | Wengreen | |
| D845,959 S | 4/2019 | Wengreen | |
| D846,369 S | 4/2019 | Ni | |
| D846,370 S | 4/2019 | Ni | |
| D852,788 S | 7/2019 | Kanter | |
| D854,191 S | 7/2019 | Sorensen | |
| D854,710 S | 7/2019 | Hendry | |
| D856,282 S | 8/2019 | Pillsbury | |
| D856,781 S | 8/2019 | Hendry et al. | |
| D859,958 S | 9/2019 | Ni | |
| 10,422,140 B2 | 9/2019 | Mitchell | |
| D866,465 S | 11/2019 | Harrison | |
| 10,480,177 B2 | 11/2019 | Siddhartha et al. | |
| D870,544 S | 12/2019 | Lai et al. | |
| 10,518,596 B2 | 12/2019 | Aitoh et al. | |
| 10,597,899 B2 | 3/2020 | Crandall et al. | |
| D887,025 S | 6/2020 | Styrc et al. | |
| 10,697,198 B2 | 6/2020 | Crandall et al. | |
| 10,760,298 B2 | 9/2020 | Crandall et al. | |
| D901,929 S | 11/2020 | Mccune et al. | |
| D905,067 S | 12/2020 | Wengreen | |
| D905,068 S | 12/2020 | Wengreen | |
| D905,069 S | 12/2020 | Wengreen | |
| D912,469 S | 3/2021 | Fox | |
| 10,975,584 B2 | 4/2021 | Brownmiller et al. | |
| D918,010 S | 5/2021 | Lynn et al. | |
| D920,728 S | 6/2021 | Scott | |
| D929,611 S | 8/2021 | Styrc et al. | |
| 11,098,476 B2 | 8/2021 | Jin et al. | |
| 2003/0101677 A1 | 6/2003 | Hewett | |
| 2004/0170471 A1 | 9/2004 | Wadsworth et al. | |
| 2004/0182430 A1 | 9/2004 | Seo | |
| 2006/0029462 A1 | 2/2006 | Patberg | |
| 2006/0130887 A1 * | 6/2006 | Mallookis | E04H 15/50 135/122 |
| 2006/0185706 A1 | 8/2006 | Slade | |
| 2006/0193687 A1 | 8/2006 | Ghosh | |
| 2006/0260259 A1 | 11/2006 | Morse | |
| 2007/0209312 A1 | 9/2007 | Keys et al. | |
| 2007/0266647 A1 | 11/2007 | Pedersen et al. | |
| 2008/0110583 A1 | 5/2008 | Lallemand | |
| 2008/0178551 A1 | 7/2008 | Porter | |
| 2008/0229678 A1 | 9/2008 | Goddard | |
| 2011/0179741 A1 | 7/2011 | Yen | |
| 2011/0258941 A1 | 10/2011 | Dalo | |
| 2011/0308063 A1 | 12/2011 | Feeleus | |
| 2013/0036702 A1 | 2/2013 | Paceti et al. | |
| 2013/0232758 A1 | 8/2013 | Pond | |
| 2013/0247499 A1 | 9/2013 | Zimmerman et al. | |
| 2013/0276382 A1 | 10/2013 | Workman | |
| 2013/0306808 A1 | 11/2013 | Huang | |
| 2014/0082921 A1 | 3/2014 | Adams | |
| 2015/0020857 A1 * | 1/2015 | Dominick | A61G 1/00 135/90 |
| 2015/0152630 A1 | 6/2015 | Winter | |
| 2016/0168840 A1 | 6/2016 | Monty et al. | |
| 2017/0089059 A1 | 3/2017 | Farre Berga | |
| 2017/0233996 A1 | 8/2017 | Abernathy et al. | |
| 2017/0314254 A1 | 11/2017 | Houghton et al. | |
| 2018/0070709 A1 * | 3/2018 | Ketcher | A45F 3/24 |
| 2018/0135295 A1 | 5/2018 | Bowron | |
| 2018/0135296 A1 | 5/2018 | Brekke | |
| 2018/0230664 A1 | 8/2018 | Dominguez | |
| 2018/0238041 A1 | 8/2018 | Styrc | |
| 2019/0078313 A1 | 3/2019 | Morgan | |
| 2019/0226201 A1 | 7/2019 | Nguyen | |
| 2019/0271146 A1 | 9/2019 | Fox | |
| 2019/0277022 A1 | 9/2019 | Francis | |
| 2020/0375366 A1 | 12/2020 | Chen | |

FOREIGN PATENT DOCUMENTS

| | | |
|---|---|---|
| EP | 3456990 A1 | 3/2019 |
| FR | 2300863 A1 | 9/1976 |
| FR | 2579720 A1 | 10/1986 |
| FR | 2991304 A1 | 12/2013 |
| GB | 422765 A | 1/1935 |
| GB | 910183 A | 11/1962 |
| JP | S5217102 U | 2/1977 |
| JP | 1997268655 | 10/1997 |
| WO | 201656696 A1 | 4/2016 |
| WO | 2016178637 A1 | 11/2016 |
| WO | 2019048362 | 3/2019 |
| WO | 2021094982 | 5/2021 |

OTHER PUBLICATIONS

Office action for U.S. Appl. No. 15/815,973, United States Patent & Trademark Office, dated Aug. 15, 2018.

Office action for U.S. Appl. No. 15/815,973, United States Patent & Trademark Office, dated Mar. 19, 2019.

Office action for U.S. Appl. No. 16/485,272, United States Patent & Trademark Office, dated Dec. 19, 2019.

Office action for U.S. Appl. No. 29/635,278, United States Patent & Trademark Office, dated Sep. 17, 2019.

Office Action for U.S. Appl. No. 15/815,973, United States Patent and Trademark Office, Ford, Gisele D., dated Nov. 17, 2017.

Written Opinion of the International Searching Authority for PCT/

(56) References Cited

OTHER PUBLICATIONS

CA2018/050169, Canadian Intellectual Property Office, Lily Truong, Canada, dated Jun. 21, 2018.
Office action for U.S. Appl. No. 29/635,278, United States Patent & Trademark Office, dated Feb. 14, 2020.
Pergola CUBIC 3-way corner bracket for 7×7 cm post-beam https://www.vinuovo.com/en/pergola-cubic-way-corner-bracket-for-7×7-94058077.html#reviews Aug. 1, 2019 (Year: 2019).
Toja Grid TRIO 2 Pack for 6×6 Wood G0210360-2 https://www.patioproductions.com/toja-grid-trio-2-pack-for-6×6-wood-g0210360-2.html Date Unknown.
Notice of Allowance for U.S. Appl. No. 29/635,278, United States Patent & Trademark Office, dated May 7, 2020.
Notice of References Cited for U.S. Appl. No. 29/635,278, United States Patent & Trademark Office, dated May 7, 2020.
Extended European Search Report for 18757067.6, European Patent Office, dated Jul. 23, 2020.
"Office Action for JP 2021-002877".
"Office Action for JP 2021-002878".
"Office Action for JP 2021-002873".
"Office Action for JP 2021-002874".
"Office Action for JP 2021-002875".
"Office Action for JP 2021-002876".

* cited by examiner

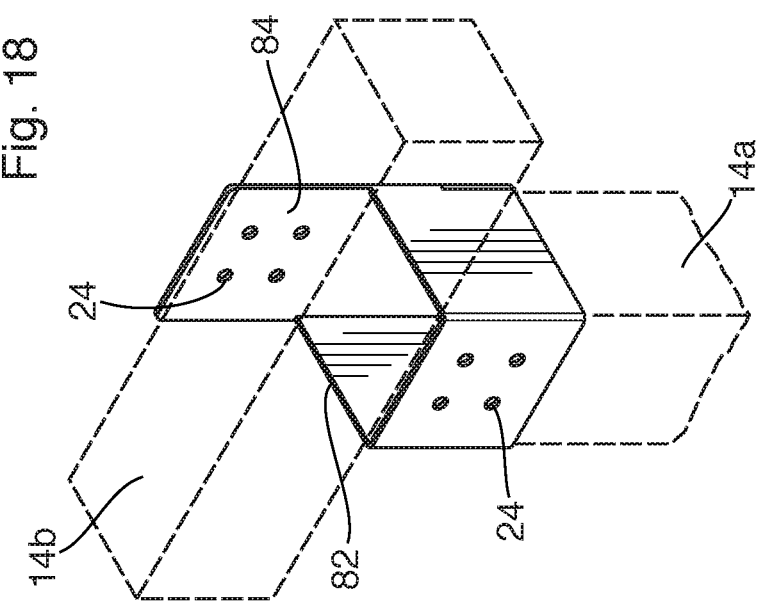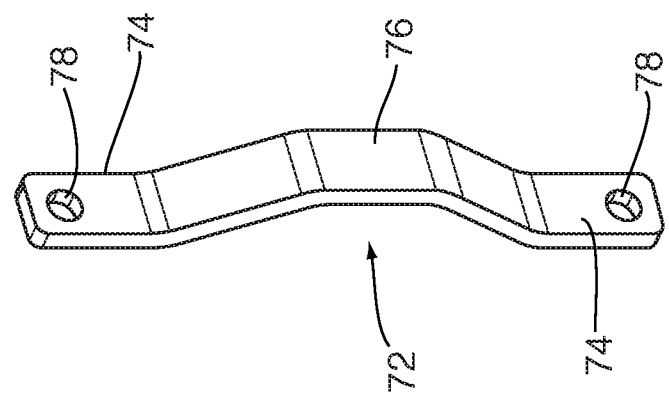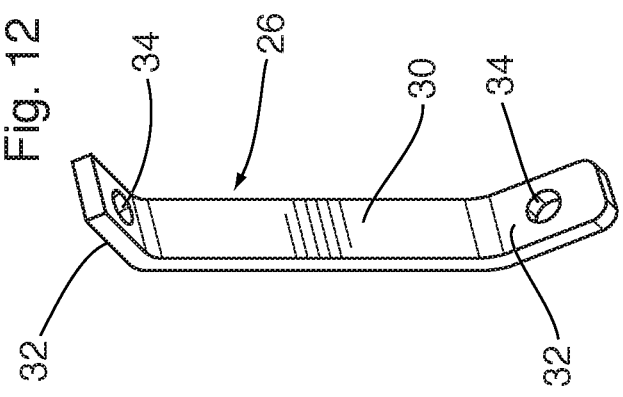

MODULAR FURNITURE SYSTEM

FIELD OF THE INVENTION

The present invention relates to a modular furniture system, primarily, though not exclusively for outdoor use.

DESCRIPTION OF THE PRIOR ART

The benefit of being able to spend time outdoors is well known but in a modern urban environment these benefits are not always readily available. It is recognised that excessive exposure to sun can be detrimental but natural shade is not always available. Similarly, relaxing in a hammock is an idyllic way to enjoy the outdoors but a hammock requires robust support to be safe and this is not always available.

Various attempts have been made to provide an enjoyable outdoor environment, such as pergolas to provide shade and dedicated free standing support frames for hammocks. These are effective but in the case of a pergola it is necessary to construct a dedicated structure that is not readily moved or stored. Whilst kits are available they consist of precut or prefabricated wooden components that require specialised tools and expertise to assemble.

Similarly, the support frame for a hammock is cumbersome and has a significant footprint even when not in use.

It is therefore an object of the present invention to obviate or mitigate the above disadvantages.

SUMMARY OF THE INVENTION

In general terms, the present invention provides a modular frame work having a plurality of elongate structural members interconnected by brackets. Each of the brackets includes at least one tubular socket to receive a structural member. An array of holes is provided on a face of the socket to permit connection of an attachment to the bracket to support ancillary components.

Preferably, the array of holes is arranged in two parallel rows spaced from one another with the holes in each row uniformly spaced apart to define a grid.

The brackets may also have a plurality of orthogonally disposed sockets with an array of holes on inwardly directed faces of respective sockets.

As a further preference, the sockets are rectilinear in cross section.

BRIEF DESCRIPTION OF THE DRAWINGS

An embodiment of the invention will now be described by way of example only with reference to the accompanying drawings in which:

FIG. 12 is a perspective view of a hanger used in the corner shown in FIG. 11

FIG. 16 is a perspective view of a clip used in the framework of FIG. 3

FIG. 18 is a perspective view of a connector for joining structural members, and, FIG. 19 is a perspective view of a bracket to connect 5 structural members orthogonally.

DETAILED DESCRIPTION OF THE INVENTION

Figure 1:
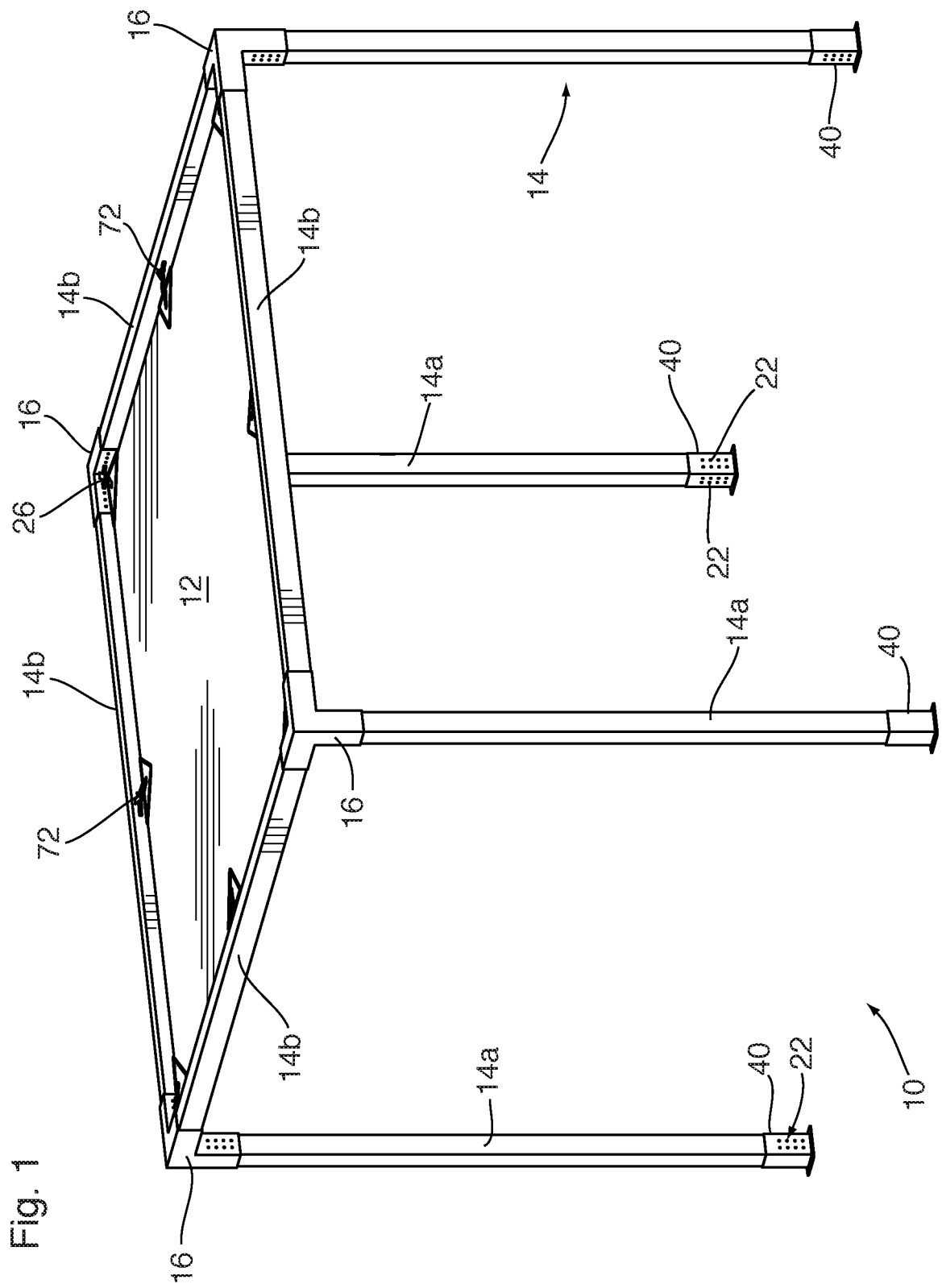
FIG. 1 is a perspective view of a frame work to provide shade

Referring to FIG. 1, a modular framework 10 is used to support a shade cloth 12 to provide a shaded area. The framework 10 consists of a plurality of elongate structural members 14 that are connected at the interstices of the framework 10 by brackets 16. The number of structural members 14 an their orientation will depend on the structure required, as illustrated in the alternative embodiments below, and similarly the number and configuration of the brackets 16 will depend on the form of the structure 10.

Each of the structural members 14 is formed from a dimensional material, typically wood although other materials such as metal or plastics could be used. Preferably, the members 14 are a weather resistant wood in a readily available cross section such as a nominal 4"×4' pressure treated lumber or cedar. Alternative dimensions may be used, such as a nominal 6"×6" lumber or an extruded aluminum 2×2 or 3×3 section.

Figure 10:
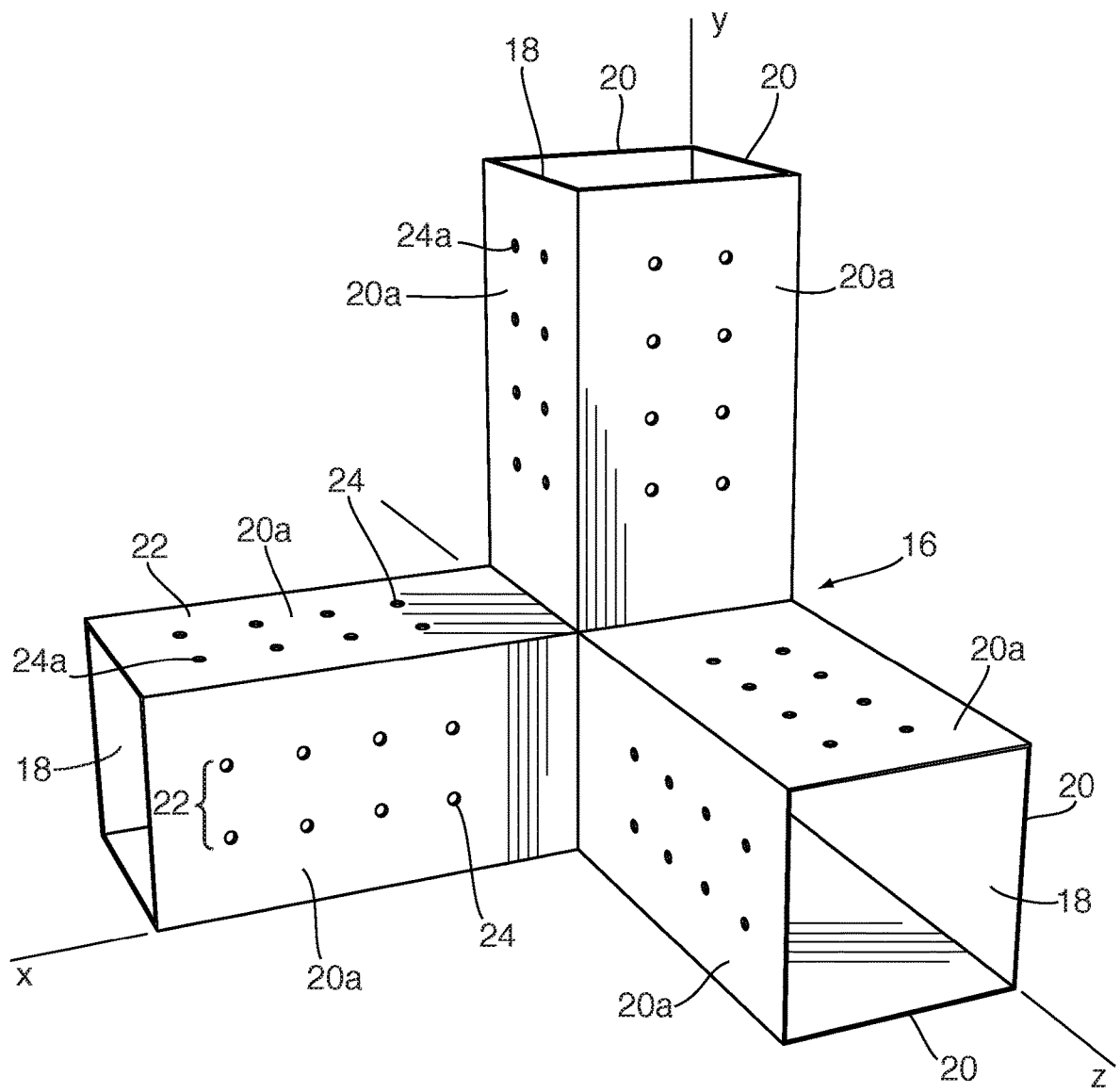
FIG. 10 is a perspective view of a bracket used in the framework of FIG. 1

The brackets 16 are formed from metal and have different configurations depending on the number of members 14 to be connected. The brackets 16 have a socket 18 for each of the members to be connected. As can be seen in FIG. 10, a corner bracket 16 to join three members orthogonally has three sockets 18 disposed along orthogonal axes, labelled X, Y, Z. Each of the sockets 18 has an internal dimension corresponding to the external dimension of the structural member 14. Thus, if the bracket 16 is to be used in a framework formed by nominal 4×4 lumber, the socket 18 will be a square cross section dimensioned to snugly receive the structural member 14.

Each of the sockets 18 is formed with 4 planar faces 20. Inwardly directed faces, that is those that are directed toward another face, as indicated at 20a, have an array 22 of holes 24 that extend through to the interior of the socket 18. The array 22 is formed by two rows of four holes 24 that are spaced from one another to provide a grid. It will be appreciated of course that other configurations of array could be used.

Referring again to FIG. 1, the structural members 14 are inserted in to the sockets 18 to provide four legs 14a and four stringers 14b so the legs 14a are disposed at the corners of a rectangle. The members 14 are secured to the respective brackets 16 by screws passing through the distal holes 24a and in to the structural member 14, so that a rigid framework 10 is provided. It will be appreciated that the dimensions of the stringers 14b may be chosen to suit the area to be covered simply by cutting the stringers 14b to the required length.

Figure 11:
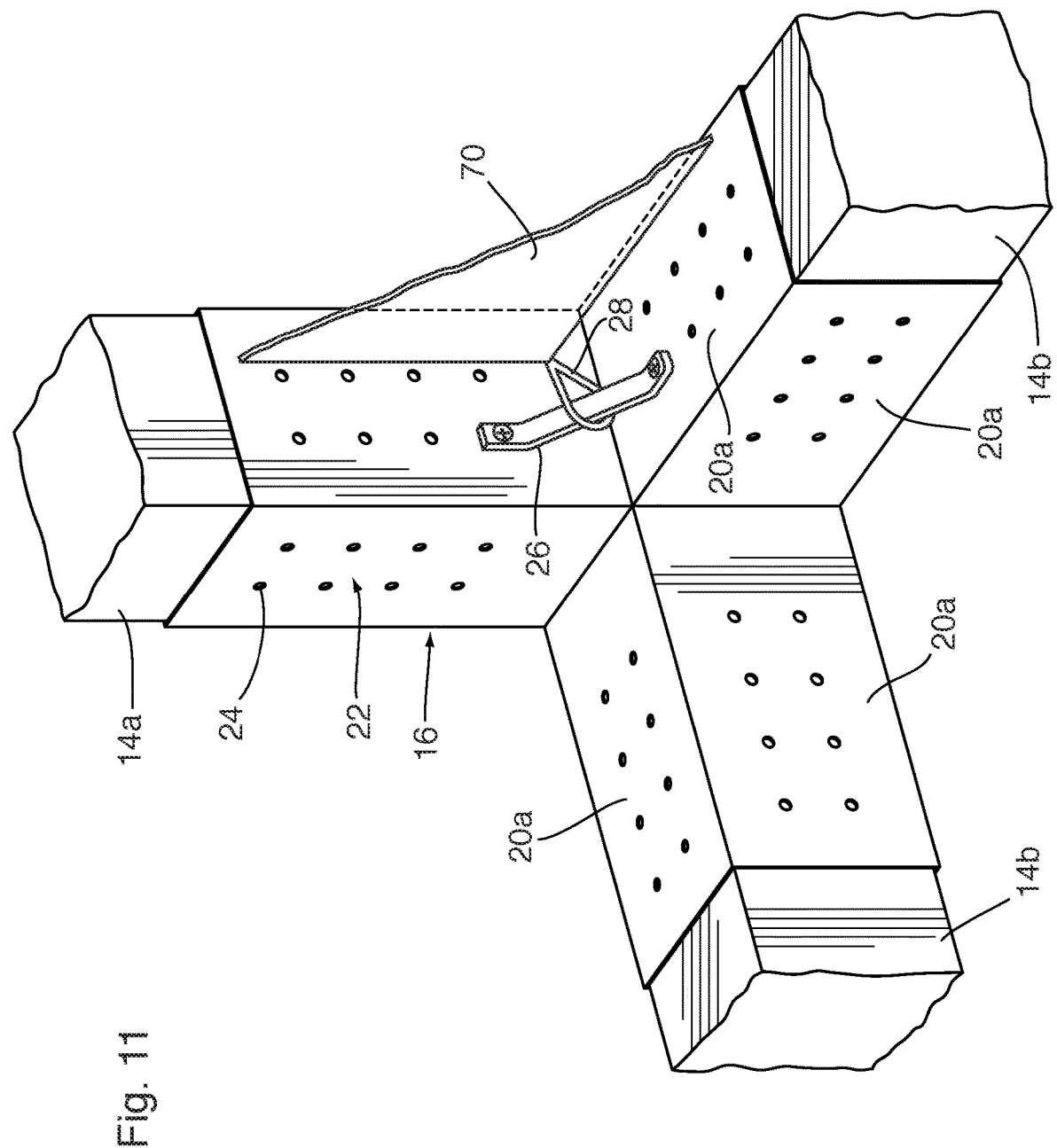
FIG. 11 is a plan view of one corner of the framework of FIG. 1.

The array 22 of holes 24 is also used to attach the shade cloth 12 to the framework 10. As can be seen in FIG. 11, a hanger 26 extends between a pair of inwardly directed faces 20a and supports an elastic loop 28 secured to a corner of the shade cloth 12 or side panel 70 described below. The hanger 26 is shown in FIG. 12 and has a central body 30 with a pair of end tabs 32 disposed at 45 degrees to the body 30. A hole 34 is formed in each of the end tabs 32. The spacing between the holes 34 is such that they align with holes 24 in adjacent faces 20a so that the hanger may be secured to each of the faces with a screw 36. The screw passes through the hole 24 and in to the member 14 to effect a secure fastening. If preferred, the screws may be self-tapping and dimensioned to engage with the holes 24 as they are inserted to provide a further fastening, but generally the fastening in to the structural member 14 is sufficient. Thus the shade cloth is secured to the framework 10 at each corner and may be readily removed if required by simply releasing the loop 28 while leaving the hanger 26 in situ.

Figure 13:
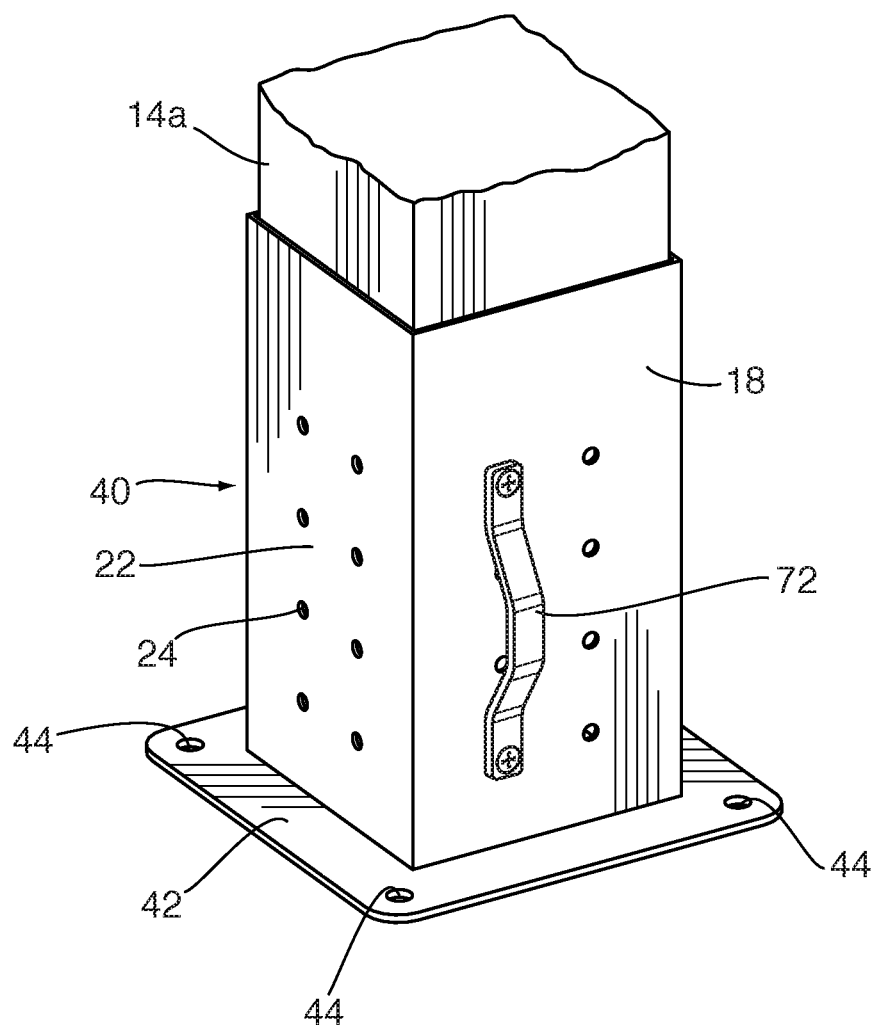
FIG. 13 is a perspective view of a foot used in FIG. 1

In the embodiment of FIG. 1, the lower end of legs 14a is located to the substrate by feet 40 shown in greater detail in FIG. 13. The feet 40 each have a socket 18 that is secured to a plate 42. The socket 18 has an array of holes 24 formed on one of its faces 20 to allow the foot 40 to be secured to the leg 14a. The plate 40 has bolt holes 44 at each apex to allow the foot to be secured to the substrate if required.

It will be appreciated that the framework 10 may be easily disassembled for storage and different lengths of structural members used for different situations.

Figure 2:
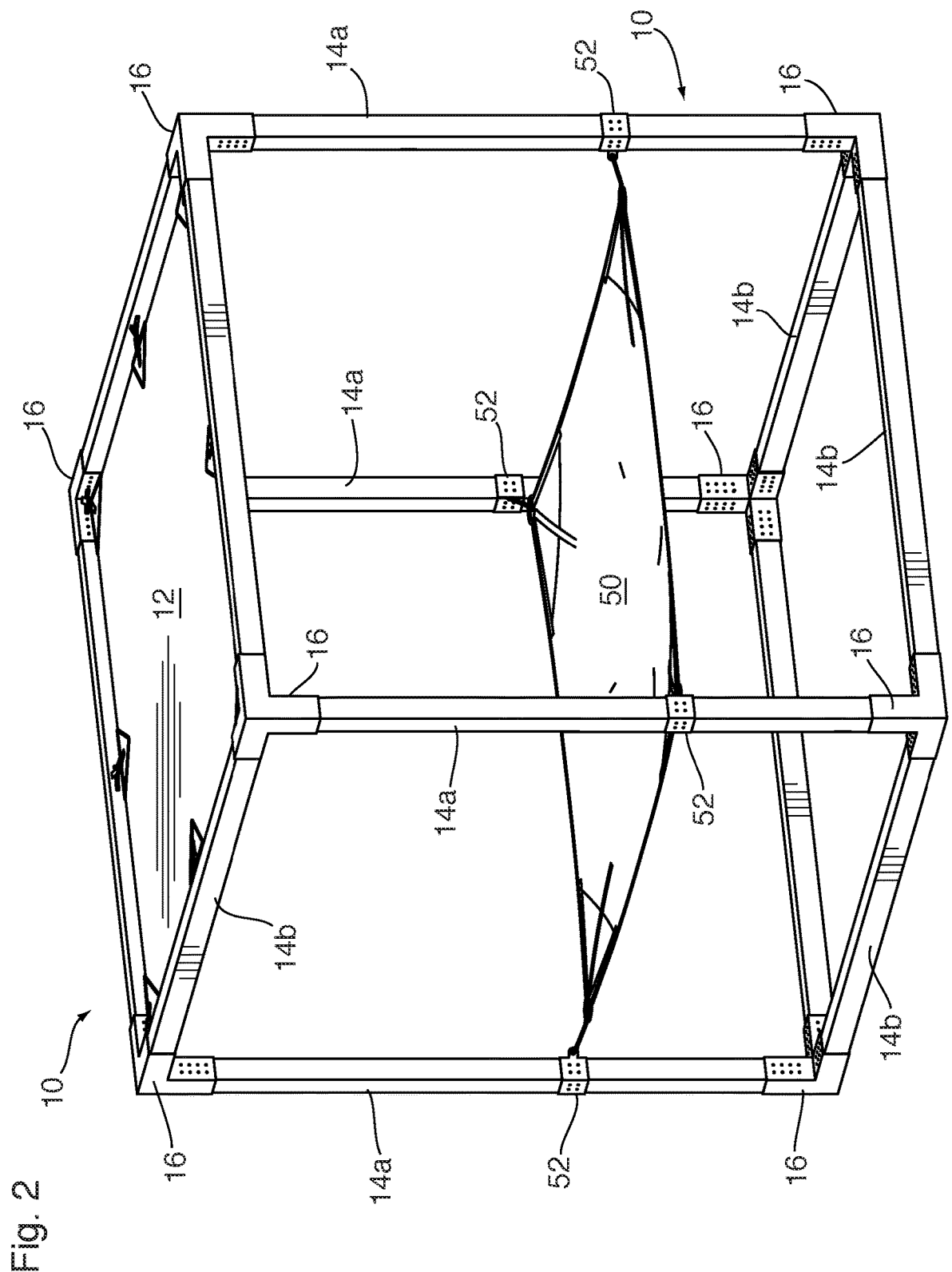
FIG. 2 is a perspective view of a frame work similar to FIG. 1 in which support for a hammock is provided.

A further embodiment of framework is shown in FIG. 2 in which like reference numerals will be used to denote like components. In the embodiment of FIG. 2, the feet 40 are replaced with corner brackets 16 and stringers 14b inserted to provide a lower peripheral rim. The frame work 10 thus forms a self supporting cube. As in the embodiment of FIG. 1, the shade cloth 12 is secured using hangers 26.

Figure 14:
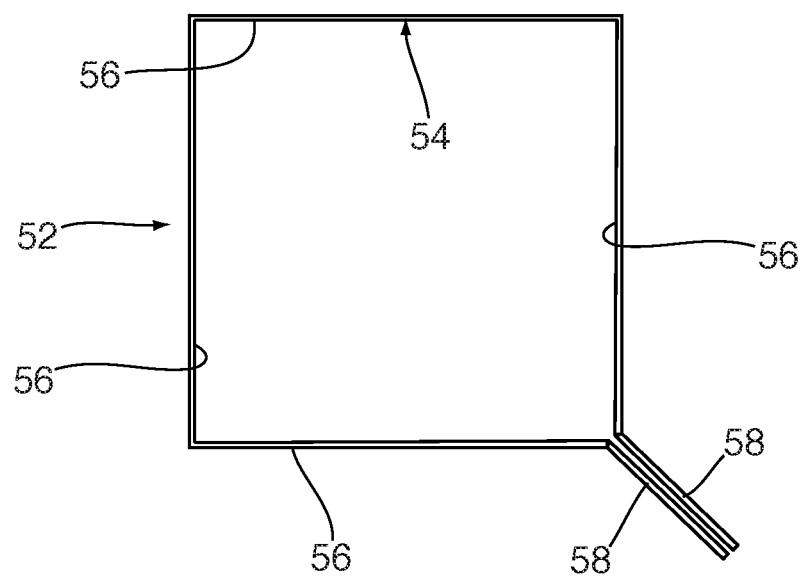
FIG. 14 is a plan view of a collar used in the embodiment of FIG. 2
Figure 15:
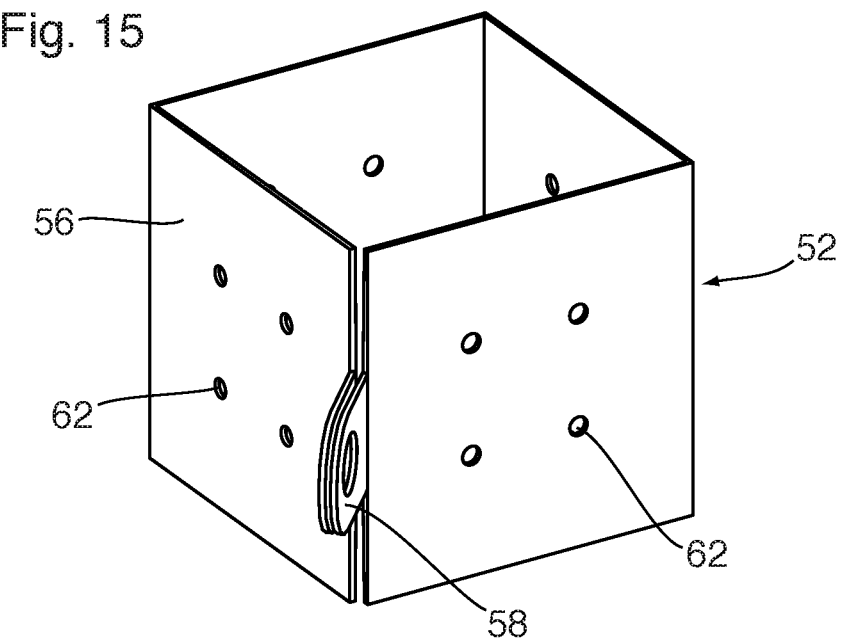
FIG. 15 is a perspective view of the collar of FIG. 14

The rigidity of the frame work 10 permits a hammock, 50 to be secured to the legs 14a using a collar 52 shown in greater detail in FIGS. 14 and 15. Collar 52 has an open band 54 with 4 faces 56. The band is dimensioned to fit around the structural member 14 and has a pair of devises 58 projecting from opposite ends of the band 54. A mounting hole 60 is formed in each clevis. The faces 56 adjacent the devises 58 are provided with an array of holes 62 that are arranged as a 2×2 grid and of similar size to the holes 24 in the brackets 16.

The collar 52 may be slid along the leg 14a to the required position and screws inserted through the holes 62 to secure the collar in position. Typically, the collar 52 will be located on the leg 14a before assembly of the stringers but mat be retroactively fitted or removed by opening the band 52 to allow the leg 14a to pass between the devises 58. With the collar located and secured at the required height, the hammock 50 mat be attached to the hole 60 in the clevis using a ring or other suitable fastener. The rigid framework 10 provides a secure attachment for the hammock and the array of holes 62 in the faces of the collar 52 ensures a secure location on the legs 14a.

Figure 3:
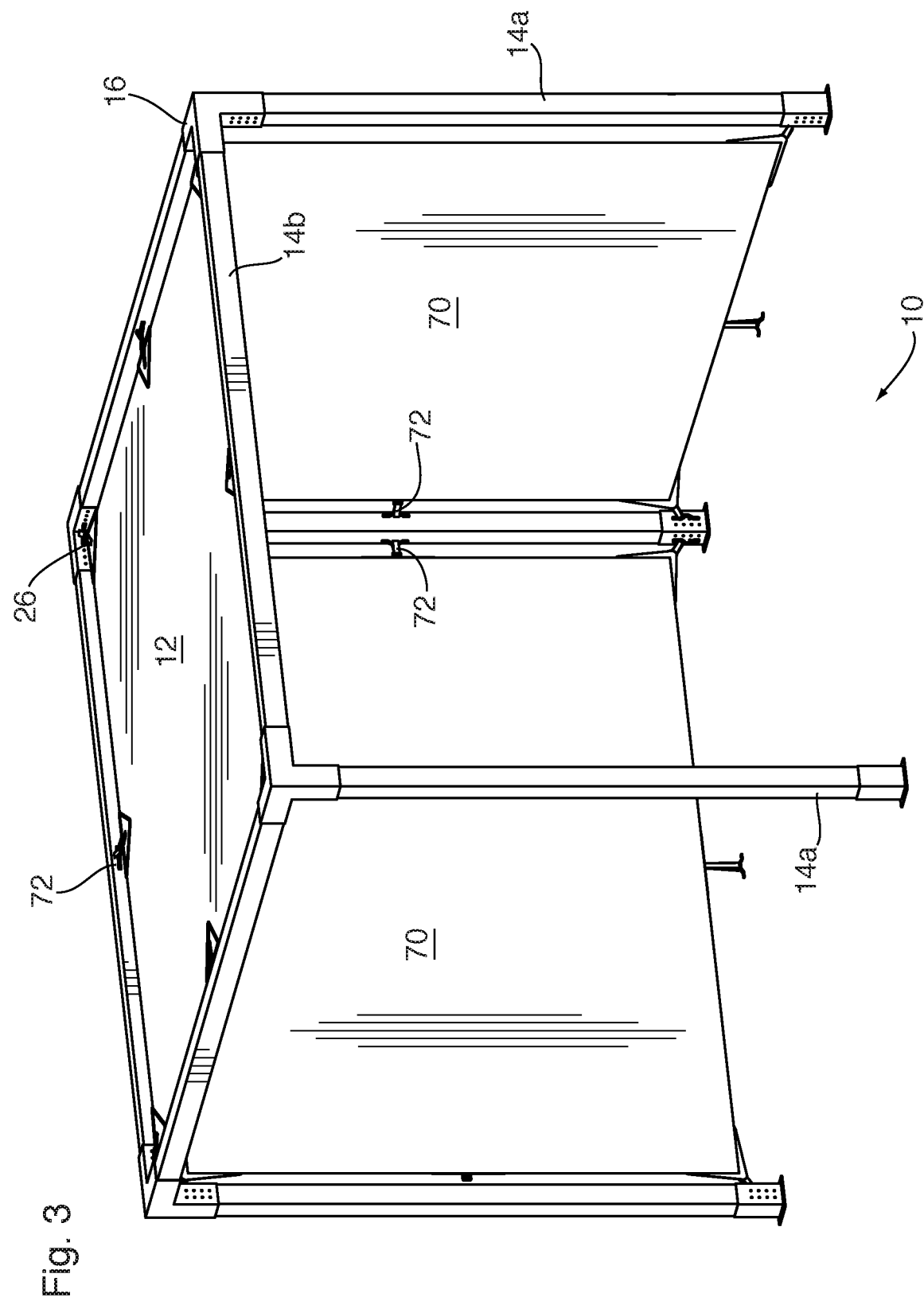
FIG. 3 is a perspective view of the framework of FIG. 1 used to provide shade and privacy.

The framework 10 of FIG. 1, or that of FIG. 2 is extra rigidity is required, may also be used to provide side walls as shown in FIG. 3. In the arrangement of FIG. 3, side screens 70 are secured within the vertical apertures formed by a pair of legs 14a and a pair of stringers 14b. A mounting clip 72, shown in greater detail in FIG. 16, is used at each corner and mid span as necessary. The clip 72 is similar to the hanger 26 described above but tabs 74 are oriented parallel with the body 76. Holes 78 are spaced so that they align with a pair of holes in a row on the array of one socket and thus provide a mounting point on either the horizontal or vertical face of the corner bracket 16. The clips 72 are positioned at each corner of the side screens 70, as shown in FIG. 13, and allow the screens to be attached within the apertures. The clips 72 may be attached to either row of holes 24 in the array allowing the side screen to be inset or offset relative to the members 14.

Figure 4:
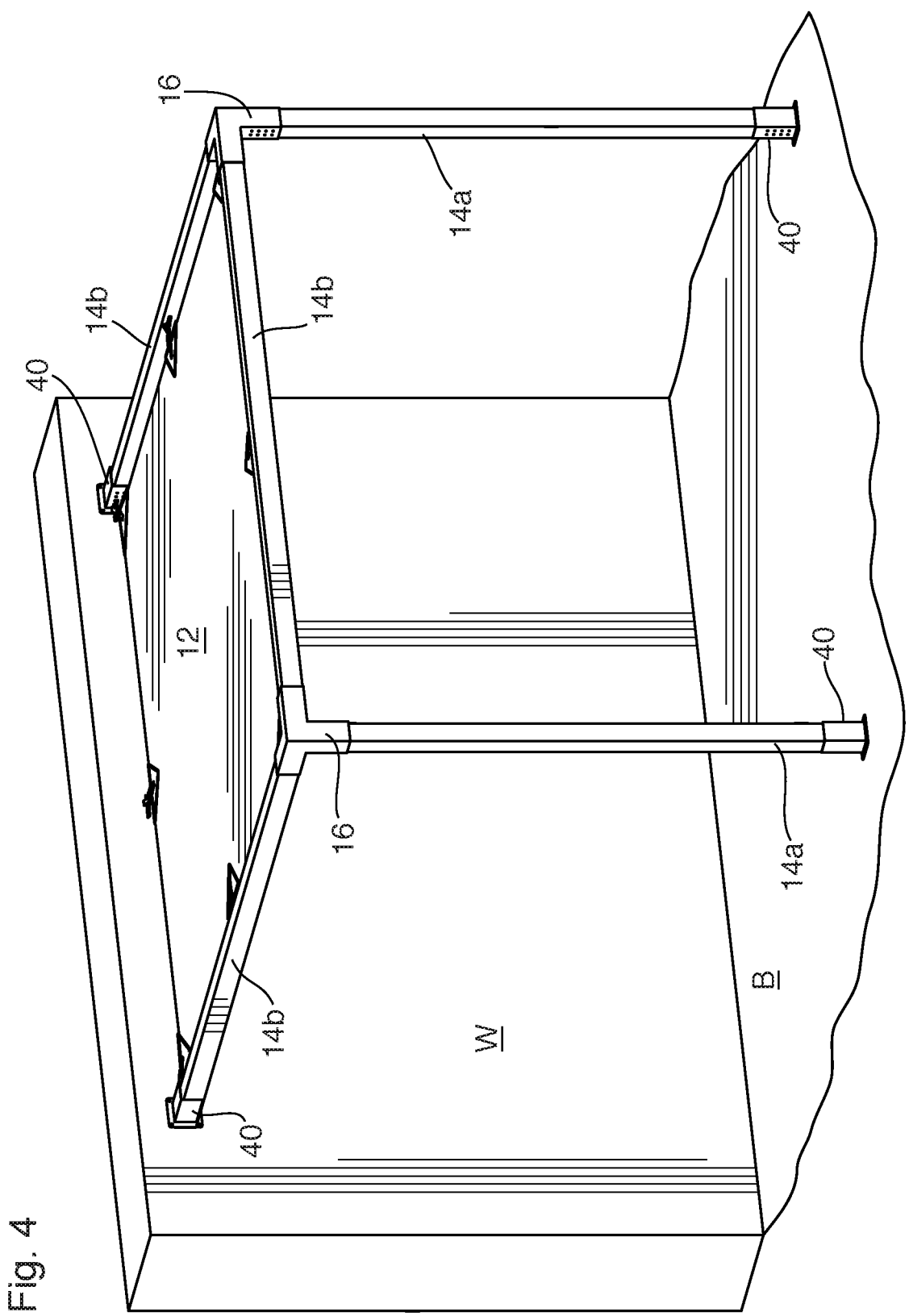
FIG. 4 is a perspective view of a framework connected to a surrounding structure.

In the above embodiments, the framework 10 is freestanding. However, as shown in FIG. 4. The corner brackets 16 and feet 40 may be used with a surrounding structure to provide a shaded area. In the embodiment of FIG. 4, a pair of legs 14a is used in combination with a pair of stringers 14b to provide an L-shaped frame work. Feet 40 are mounted on the ends of the legs 14a and the stringers to connect the legs 14a to a base B and the stringers to a wall W. A shade cloth 12 is supported by the stringer 14b to provide shade. The connection of the shade cloth to the corner brackets 16 is by way of the hangers 26 as described above. To connect the shade cloth 12 adjacent the wall W, the clip 72 is secured to the array 24 provided on one of the faces 20 of the foot 40. In this case, the face with the array is directed toward the other stringer so the shade cloth may lie within the plane of the stringers.

Figure 5:
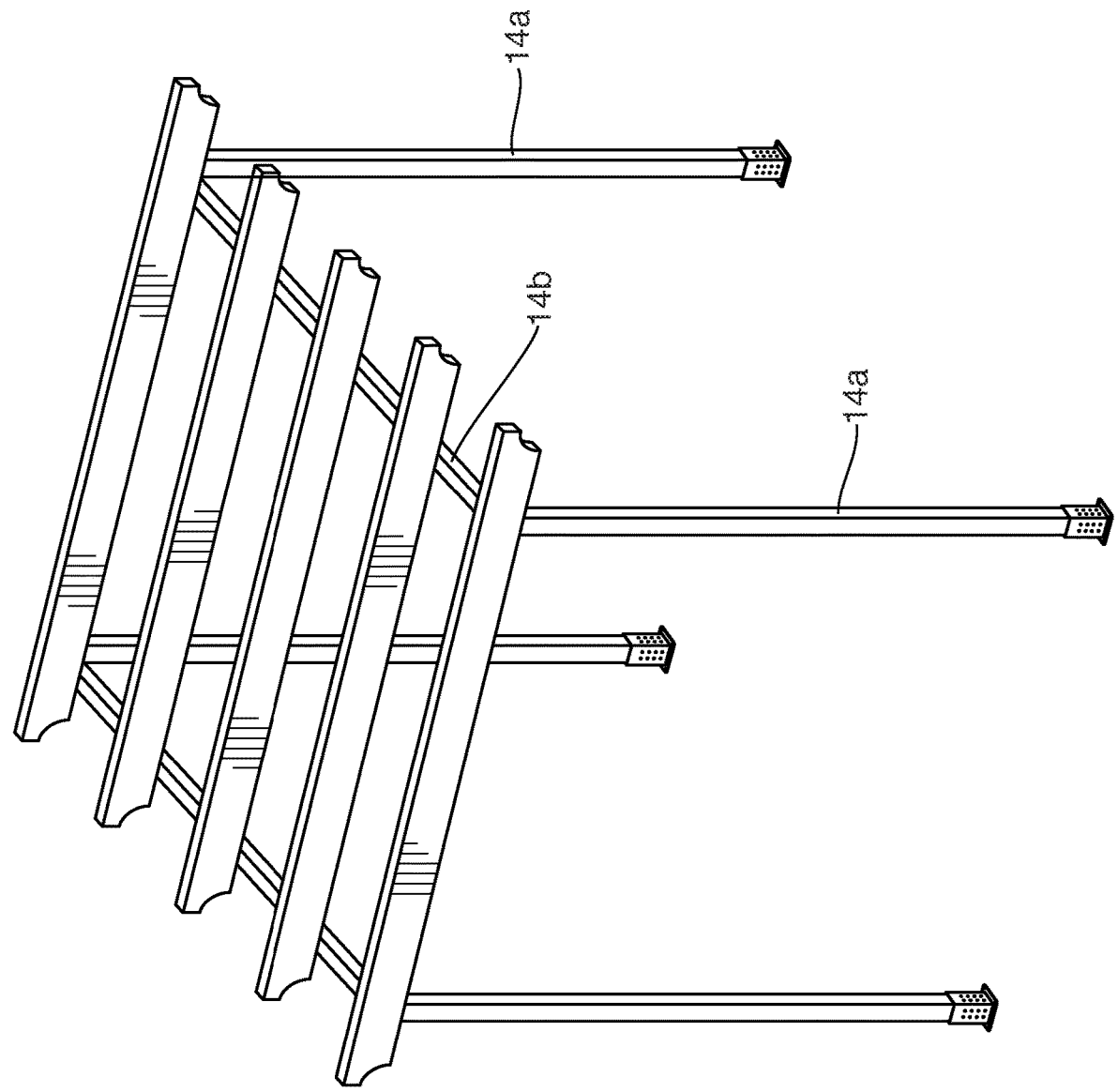
FIG. 5 is a perspective view of a framework providing support for a pergola.

Each of the above embodiments has used a shade cloth 12 to provide shade. In the embodiment of FIG. 5, the stringers 14b are used to support vertical planks at spaced intervals to form a pergola.

Figure 6:
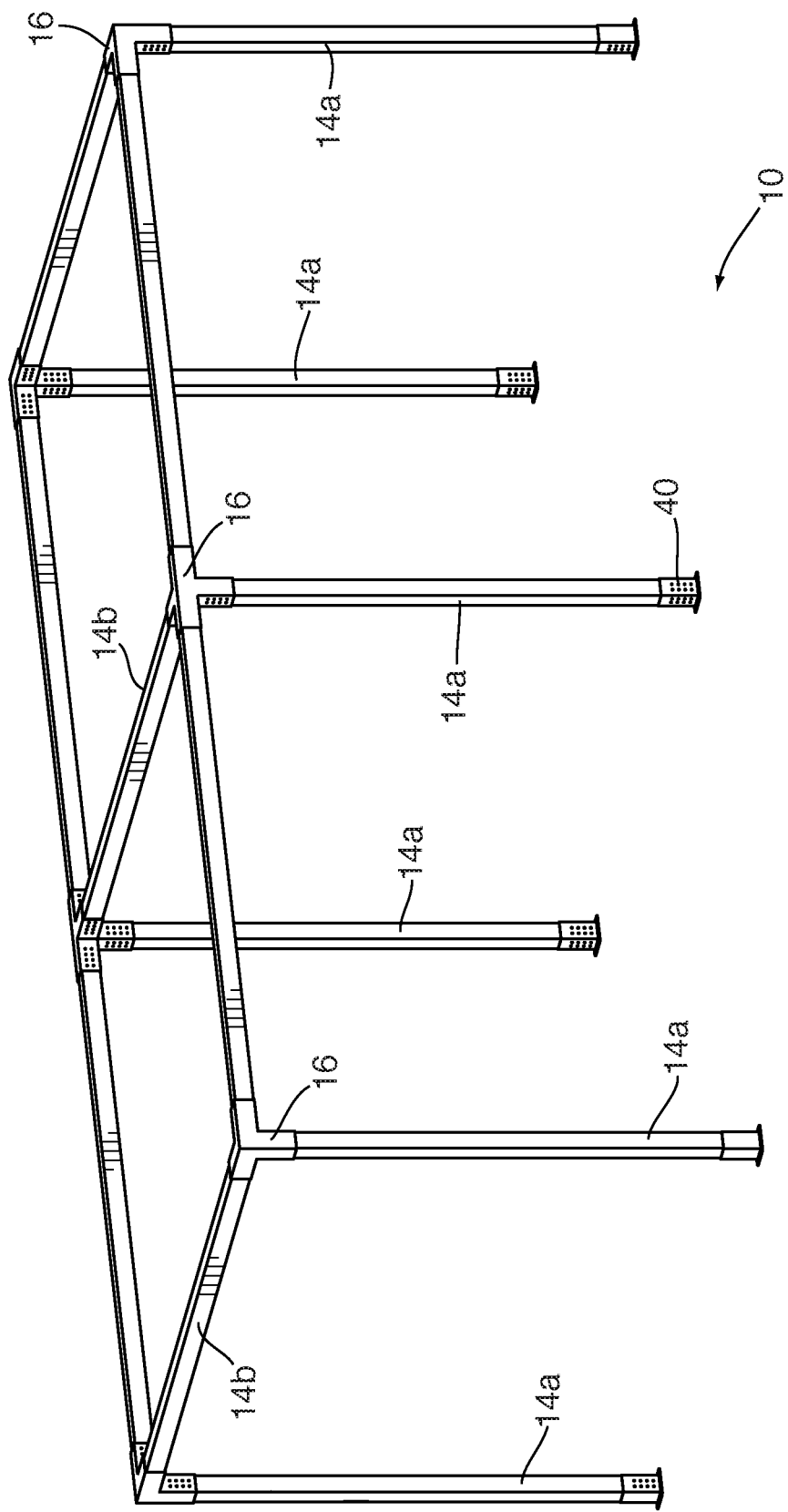
FIG. 6 is a schematic representation of an expanded framework similar to FIG. 2.

The framework 10 may be used in combination with other frameworks to provide larger structures. As seen in FIG. 6, a pair of structures as shown in FIG. 1 are arranged side by side to provide an enlarged framework. The array of holes at each bracket 16 is available to permit shade cloth or side walls to be attached to the stringers, and of course hammocks can be secured to either or both sets of legs 14a.

Figure 7:
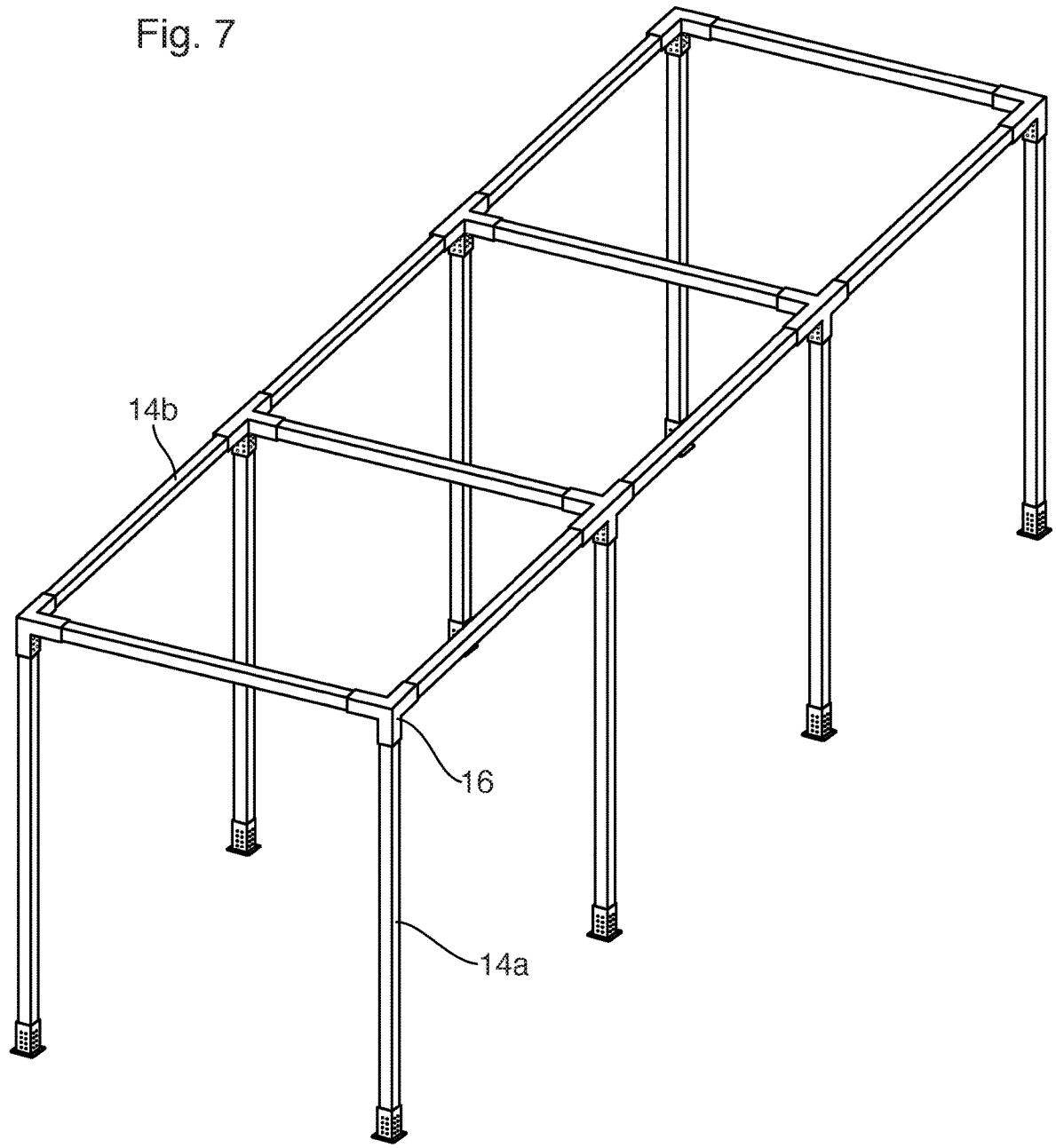
FIG. 7 is a perspective view similar to FIG. 6 showing a further expansion of the framework
Figure 8:
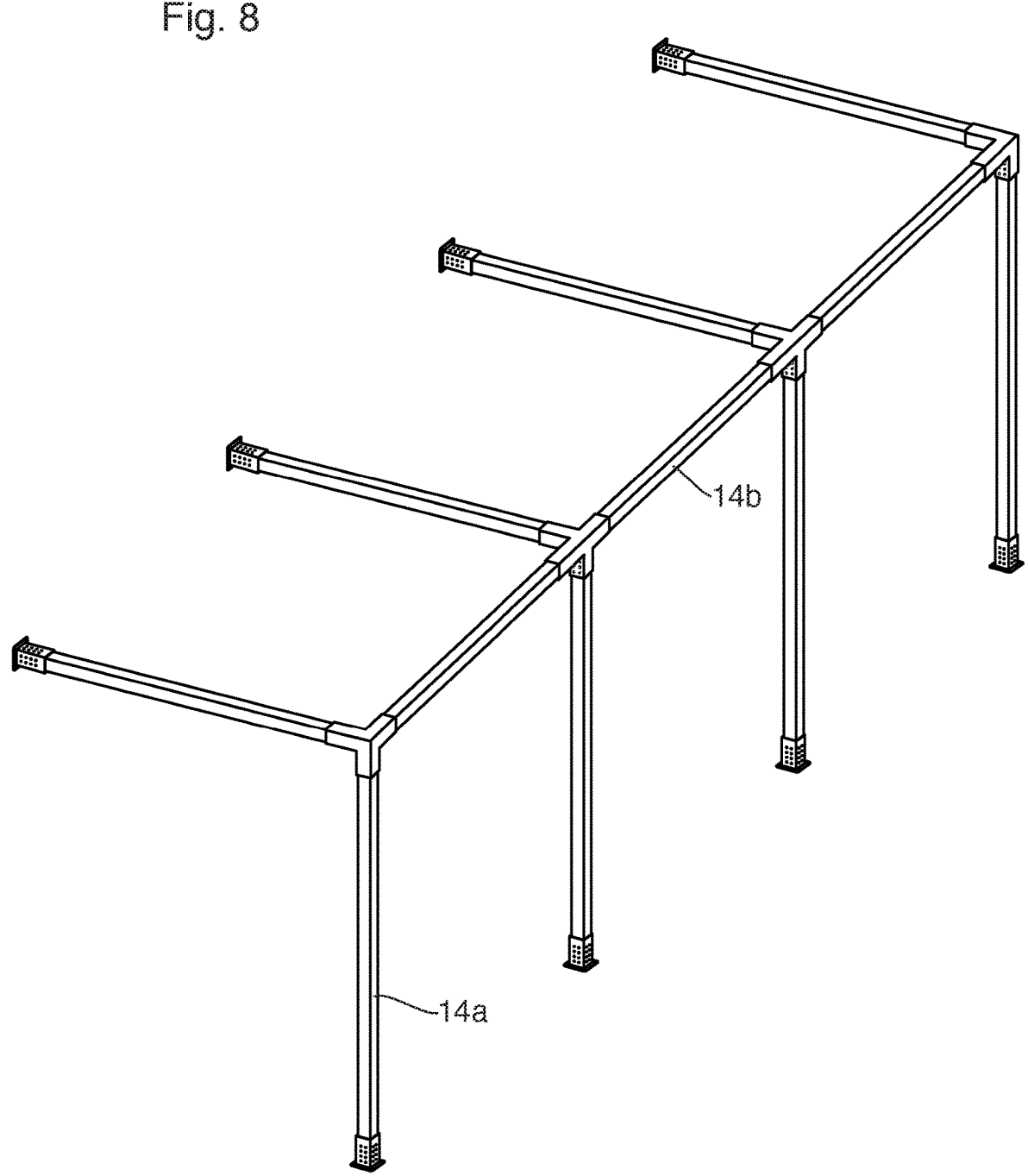
FIG. 8 is a view of the framework of FIG. 1 with an alternate fastening
Figure 17:
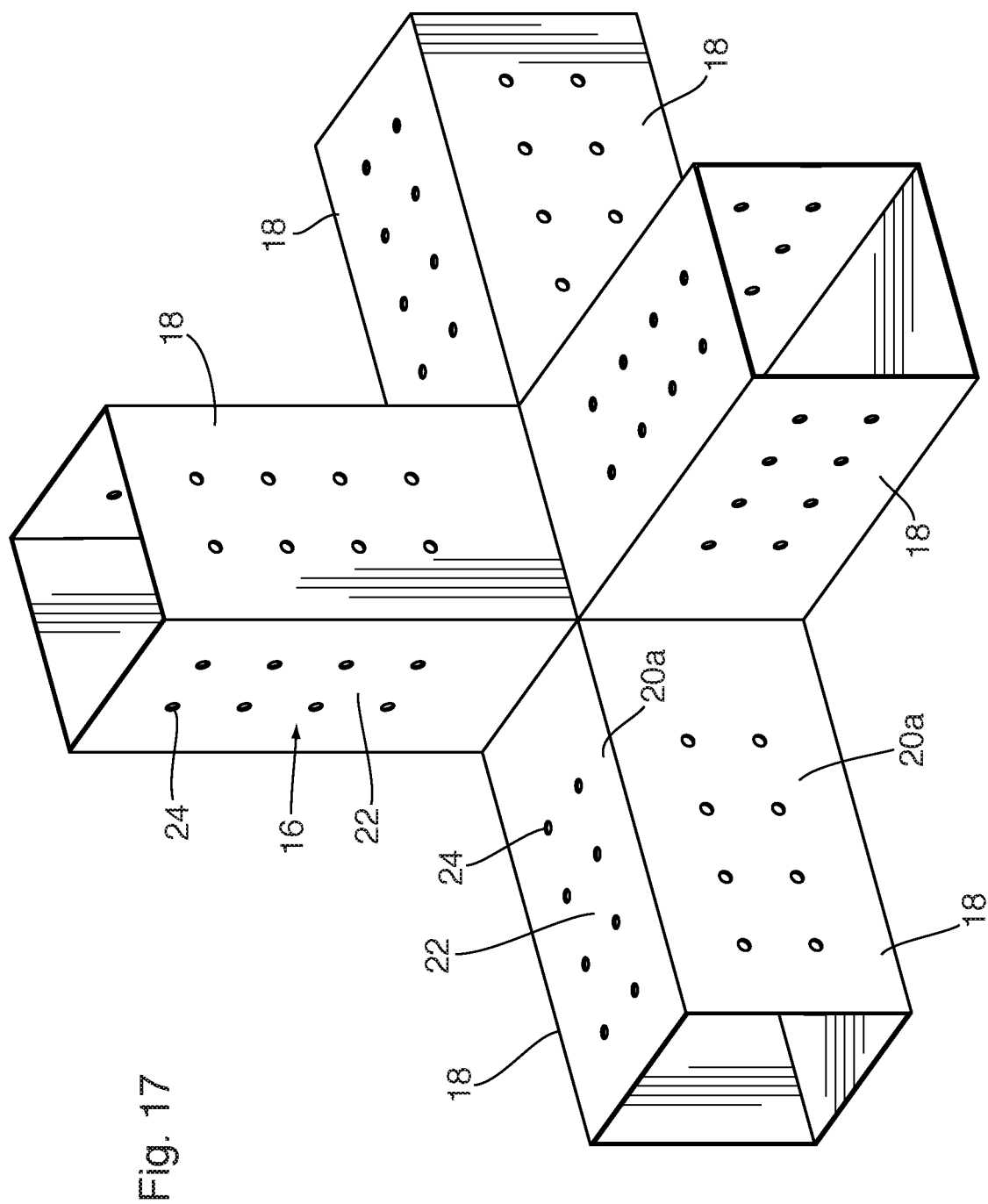
FIG. 17 is a perspective view of a bracket connecting 4 structural members.

Similarly, in the embodiment of FIG. 7, an open framework as shown in FIG. 1 is connected end to end. In these embodiments, as shown in FIG. 17 the corner bracket 16 is arranged to connect four elongate members 14 on orthogonal axes by proving a socket 18 extending to both sides of the node of the bracket 16. Each of the inwardly directed faces 20a has an array of holes 24 to permit attachment of shade cloth or side walls as required.

The bracket 16 shown in FIG. 17 may also be used with the framework shown in FIG. 4 to provide an extended L-shaped framework support by a wall W.

Figure 9:
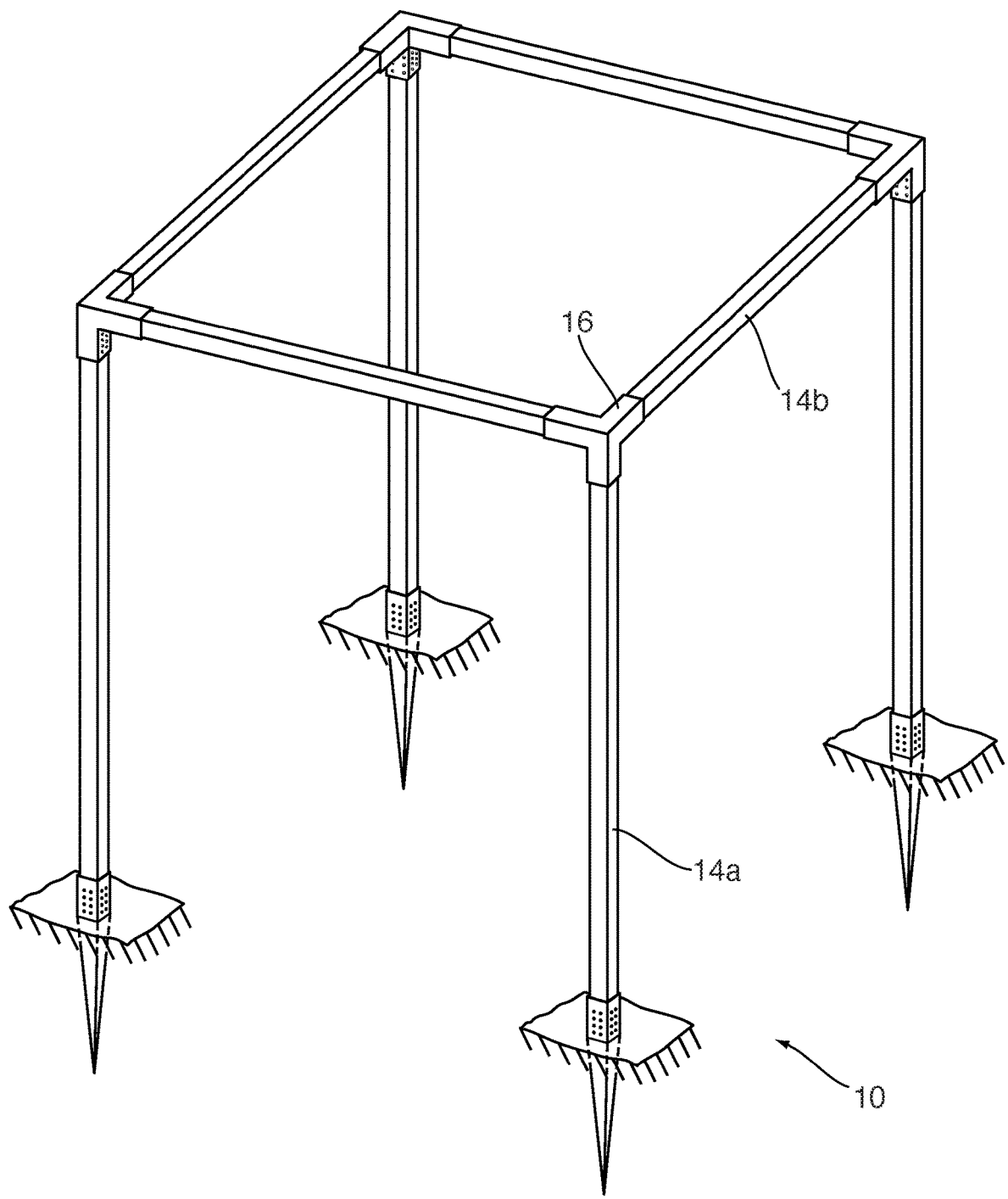
FIG. 9 is a schematic representation of the frame shown in FIG. 4 expanded.

The feet 40 may be adapted for use on soil or sand by providing spikes extending from the sockets 18, as shown in FIG. 9.

The versatility of the framework 10 may be increased by using the connector 80 shown in FIG. 18 to connect a pair of structural members 14 at right angles to one another. The connector 80 has a body defined by a square peripheral wall 82 which is dimensioned to fit over one end of a structural member and a tongue 84 projects from one of the faces of the wall. One face of the wall 82 and the tongue 84 have a 2×2 array of holes 24 so that the body may be secured to one end and the tongue used for connection to another structural member. In this way, as shown in FIG. 18, horizontal rails can be secured between legs 14a and/or pickets can be secured to rails or stringers.

Figure 19:
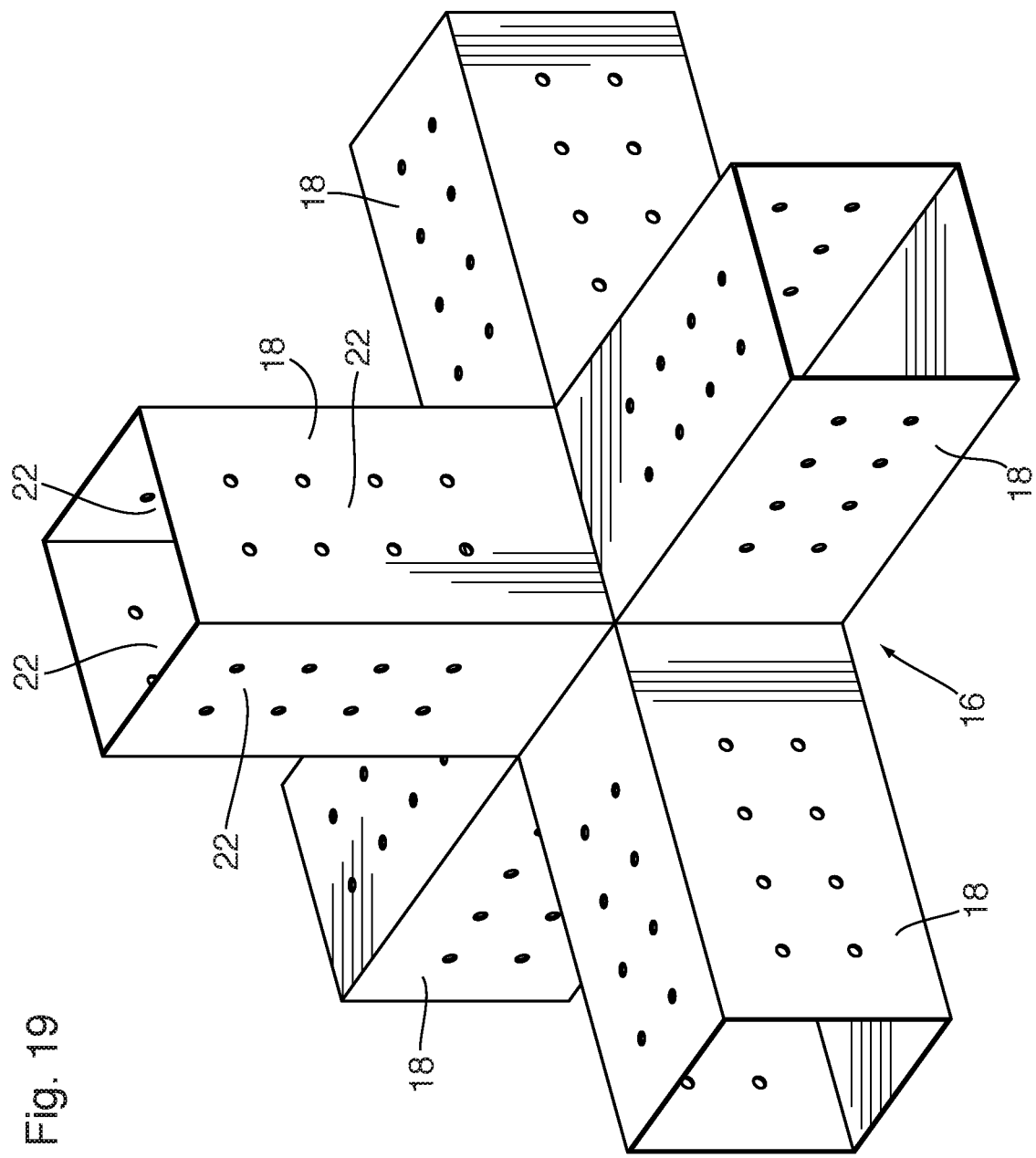

A further embodiment of connector 16 is shown in FIG. 19 that is used to connect 5 structural members 14. Four of the sockets 18 lie in a common plane and the fifth socket 18 is orthogonal to the other sockets. Each of the planar faces 20 of the fifth socket has an array 22 of hole 24 to allow corner hangers 26 or clips 72 to be secured.

In each of the above embodiments it will be recognised that the provision of the array of holes in the inwardly directed faces of the connectors 16 permits not only the structural members to be secured to the brackets for a robust framework, but also allows ancillary components, such as hangers and clips to be attached in a simple manner in a variety of orientations to allow attachment of accessories. The grid defined by the two rows of holes 24 allows base plates of accessories such as light fittings to be secured to the connectors and thereby add to the versatility. The framework is readily disassembled and reconfigured for different purposes or for storage.

The brackets 16 are made from steel or aluminum and can be constructed by welding tubular sections to one another or, preferably, by folding a metal blank in to the required configuration. Where the brackets are folded, it is preferred that the free ends of the blank are mechanically interlocked, such as by a dovetail, after folding to maintain the folded blank in the correct configuration for welding the free ends to one another.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A structure having a frame defined by a plurality of elongate structural members, said structural members including a plurality of vertically extending posts and a plurality of longitudinal stringers extending between said posts, an upper end of each of said posts being connected to at least a pair of said longitudinal stringers by a bracket to define a corner of said frame, each bracket having a socket to receive an end of each of the structural members converging to the respective corner, said structure further including a plurality of collars each extending about a respective one of the posts and adjustable along the length of the post to be located at a required height between opposite ends of the post, each collar having an attachment point to allow attachment of a cloth panel to the collar, and a cloth panel secured to each of the collars at said attachment point and extending between and supported by said posts intermediate the ends of said posts to provide a hammock spaced vertically from said stringers.

2. The structure of claim 1 wherein said collars are secured to said posts at said desired locations by fasteners extending through said collar and into said post.

3. The structure of claim 2 wherein said collars are formed as bands extending about said posts to conform to the exterior surface of said post and said attachment point is formed at distal ends of said band.

4. The structure of claim 3 wherein said distal ends of said band are juxtaposed and each has a hole therein to provide a clevis for attachment of said cloth panel.

5. The structure of claim 4 wherein said post is polygonal in cross section and said distal ends of said band project from an apex of said polygon toward the interior of said frame.

6. The structure of claim 5 wherein said post has a square cross section.

7. The structure of claim 2 wherein said collar has contiguous planar faces and an array of holes is provided on at least one of said faces to receive said fasteners.

8. The structure of claim 7 wherein said array of holes is arranged as a grid.

9. The structure of claim 7 wherein an array of holes is provided on each of said planar faces.

10. The structure of claim 1 wherein a hanger extends between a pair of said sockets connecting said longitudinal stringers at each corner and a shade cloth is connected to and extends between said hangers to provide a roof extending over and spaced from said hammock.

11. The structure of claim 10 wherein each socket has a face inwardly directed toward a face of an adjacent socket to provide pairs of opposed faces on each of said brackets, and said hanger extends between a pair of opposed faces on said brackets.

12. The structure of claim 11 including holes in said pairs of opposed faces to accommodate a fastener to secure respective ones of the structural members to the bracket.

13. The structure of claim 12 wherein a plurality of holes is provided in each of said opposed faces and said hanger is secured to said socket through one of said holes and said bracket is fastened to said structural member through another of said holes.

14. The structure of claim 13 wherein said holes are arranged as an array having two rows of holes spaced apart to define a grid.

15. The structure of claim 1 wherein a hanger extends between a pair of said sockets connecting one of said longitudinal stringers and one of said posts at each corner and a cloth panel is connected to and extends between said hanger and an attachment point on said post to provide a side panel extending generally perpendicular to said hammock.

16. The structure of claim 1 wherein the lower end of said posts is secured in a foot having a socket attached to substrate.

17. The structure of claim 16 wherein said foot has a base plate extending laterally from the socket.

18. The structure of claim 17 wherein said foot has a planar face and an array of holes on said planar face.

19. The structure of claim 18 wherein a clip is secured to said array of holes to provide an attachment point for a side panel extending from a corner to said foot.

20. The structure of claim 1 wherein the lower end of each of said posts is received in a socket of a bracket and longitudinal members are received in orthogonal sockets of said bracket, said longitudinal members extending between brackets on respective ones of said posts to provide an enclosed frame.

21. The structure of claim 20 wherein each socket of the bracket at the lower end of a post has a face inwardly directed toward a face of an adjacent socket to provide pairs of opposed faces on each of said brackets, and a hanger extends between a pair of opposed faces on said brackets.

22. The structure of claim 21 including holes in said pairs of opposed faces to accommodate a fastener to secure respective ones of the structural members to the bracket.

23. The structure of claim 22 wherein a plurality of holes is provided in each of said opposed faces and said hanger is secured to said socket through one of said holes and said bracket is fastened to said structural member through another of said holes.

24. The structure of claim 23 wherein said holes are arranged as an array having two rows of holes spaced apart to define a grid.

* * * * *